C. A. JUDSEN.
HOOF PAD.
APPLICATION FILED JAN. 2, 1913.
1,060,096.
Patented Apr. 29, 1913.
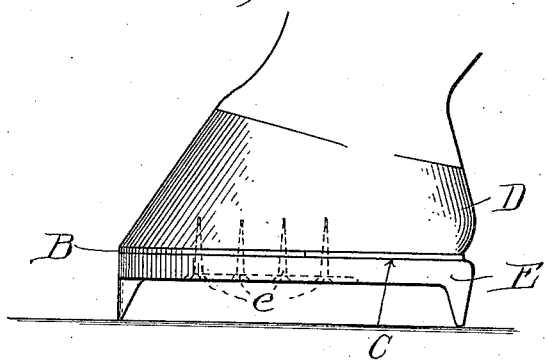
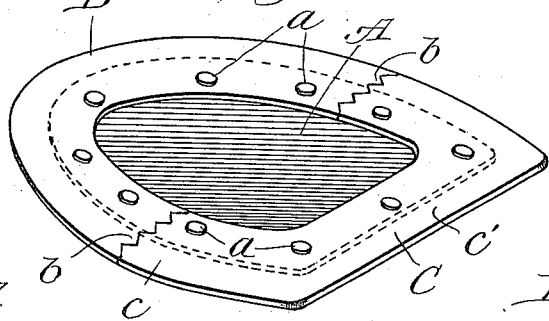
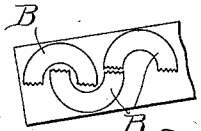
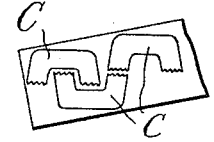
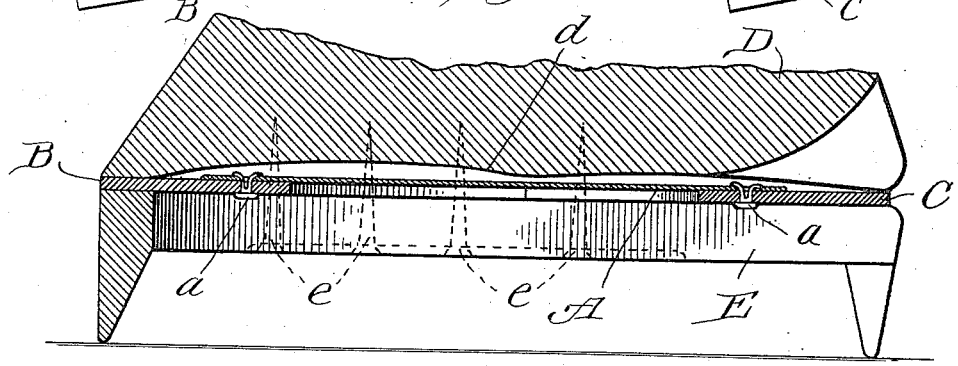
Witnesses:
Harry S. Gaither
Charles H. Poole
Inventor
Carl A. Judsen.
By Poole & Crowen
Attys

UNITED STATES PATENT OFFICE.

CARL A. JUDSEN, OF CHICAGO, ILLINOIS.

HOOF-PAD.

1,060,096.  Specification of Letters Patent.  Patented Apr. 29, 1913.

Application filed January 2, 1913. Serial No. 739,636.

*To all whom it may concern:*

Be it known that I, CARL A. JUDSEN, a citizen of the United States, and a resident of Chicago, in the county of Cook and State of Illinois, have invented certain new and useful Improvements in Hoof-Pads; and I do hereby declare that the following is a full, clear, and exact description thereof, reference being had to the accompanying drawings, and to the letters of reference marked thereon, which form a part of this specification.

This invention relates to improvements in hoof pads, and particularly to that class of hoof pads which are adapted to be interposed between the hoof of the animal and the shoe for the purpose of protecting the hoof.

The principal object of the invention is to provide a form of such hoof-protecting device that is light and simple in construction, is adapted to be easily and quickly applied, is inexpensive to manufacture and is durable in use.

A hoof pad embodying my invention, conforms in its general shape to the shape of the hoof and comprises a rim or marginal portion, of durable and flexible material, which is interposed between the upper surface of the shoe and the marginal portion of the hoof and a central plate or shield of sheet metal, to which the flexible marginal portions are secured, and which extends over and covers the more tender central portions of the hoof, commonly known as the "frog." A hoof pad embodying these general features of construction is shown in a prior Patent, No. 855,188, granted to Andru Larsen, May 28th, 1897, and the present invention constitutes an improvement upon the device shown in said patent, as will hereinafter appear.

My invention consists in the matters hereinafter set forth and more particularly pointed out in the appended claims.

In the drawings—Figure 1 is a view in side elevation of a hoof provided with a pad of my improved construction, interposed between the hoof and the shoe; Fig. 2 is a view in perspective of my improved horse shoe pad, showing the lower or downwardly facing surface thereof; Fig. 3 is a vertical sectional view of the lower part of a hoof, with the horse shoe pad and horse shoe secured thereto; Figs. 4 and 5 illustrate the process of cutting a series of the U-shaped sections of the rim from pieces of rubber fabric or leather.

Proceeding with a more detailed description of my improved pad and referring to the drawings, I provide a shield or plate A made of sheet metal, and conforming in shape to the general contour of the hoof D, but smaller in all of its dimensions. Relative to the shoe E, its forward and side margins conform approximately to the outline of the inner margins of the corresponding portions of the shoe. To the shield portion A are secured separate forward and rear U-shaped marginal or rim members B and C of flexible materials. The forward rim member or toe section B is made of an elastic and compressible material, adapted to form a cushion between the shoe and hoof. I have commonly used for this purpose a rubber fabric, such as employed for machine belting, consisting of layers of heavy canvas joined together by an adhesive rubber compound, and having its surfaces coated with the same substance. The outer margin of the forward body member is curved to conform with the outer margins of the adjacent portions of the hoof and shoe. The inner margins of the rim member B overlap the shield, and are secured thereto by means of a plurality of rivets *a* passing through the said shield and the rim member adjacent to its inner margin, which is curved and parallel with the outer margin. The arms of said forward rim member extend rearwardly to points approximately midway of the front and rear ends of the shield or plate A, and are provided with transverse end margins *b*, *b*.

The rear rim member or heel section C is made of leather, is substantially of the same thickness as the forward body member B and is generally of U-form. Said rear rim member is provided with end portions or arms *c*, *c*, which extend forwardly and meet or abut against the end margins *b* of the arms on the forward rim member B. A transverse heel portion *c'* joins the said end portions or arms, the same having a straight rear margin and an inner margin parallel therewith. The inner margins of said rear rim member overlap the rear and side margins of the shield and are secured thereto by a plurality of rivets *a* passing through the shield adjacent to its margin.

The marginal portions of the hoof bear upon the front and lateral portions of the rim members B and C exterior to the margins of the shield member A. The shoe E is secured to the hoof in the usual manner by a plurality of nails e, e, extending through the forward lateral portions thereof, and likewise extending through the flexible rim members of the pad. The arms of the U-shaped front and rear rim members are made of such relative lengths, or the meeting line between said members is so located, that one or more of the nails pass through the arms c, c of the rear rim member. The rear rim member is made of leather for the purpose and with the result set forth in said prior Larsen patent, to wit, in order to provide a cushioning layer between the hoof and the rear ends of the shoe, of such tough and durable material as will withstand the hammering action and wear due to the fact that the cushioning layer at these points extends loosely between the hoof and the ends of the shoe, and is not held or clamped firmly in place, as is the case with the part of the rim which is clamped or confined between the shoe and hoof by the fastening nails, that are located at such forward part of the shoe.

The making of the forward and rear rim sections or members B and C of U-shape and with relatively short, substantially parallel arms, as described, has the advantage of enabling the same to be cut from pieces or strips of fabric or leather with little waste of material. Figs. 4 and 5 show the manner in which the said sections may be so cut, the arm of one section in each instance being cut from the material embraced between the arms of another section. In the construction shown in said prior Larsen patent, economy of material in cutting out the rim members is obtained by making the rim member of two curved parts, divided at the forward end of the pad, while in the present construction the advantage is gained that the same degree of economy in cutting may be obtained notwithstanding that the forward and rear sections extend continuously across the forward and rear ends of the pad.

A pad embodying my invention has advantages as compared with that shown in said Larsen patent which may be understood from the following: By making the rear or leather section C of the rim of U-form and extending the forwardly projecting arms or end portions c, c thereof a sufficient distance toward the forward or toe end of the pad to enable the one or more of the nails by which the shoe is secured to the hoof to pass through the said arms, the latter are securely held and clamped in proper position between the rear part of the shoe and the hoof. By reason of the forward ends of said arms being so securely held in place, and the inner margins of said arms being attached to the sides of the plate or shield, the rear lateral corners of said leather section are certainly and securely maintained in position to receive the impact or pressure of the rear ends of the shoe. In other words, when the leather heel section extends forwardly along the side margins of the central plate and its arms are secured at their inner margins to the plate and said arms are engaged by one or more of the nails, as described, the rear corner portions of the heel section are thereby positively and certainly held in position beneath the rear ends of the shoe and are prevented from being misplaced or thrown out of position in the rough usage to which the pad is subjected; it being manifest that in the construction shown in said Larsen patent, wherein the straight heel strip is secured at its forward margin only to the plate, the relatively narrow ends of said strip project beyond the plate at both sides of the same and are therefore liable to become shifted out of place and rendered useless, while in the present construction the rear corner portions of the heel section are held from displacement by reason of their integral connection with both the forwardly projecting arms and transverse member of the rear section, both of which parts are connected along their inner margins with the plate. An important advantage is, moreover, gained by making the forward or toe section as well as the rear or heel section of U-form, because of the economy in cutting the sections from pieces or strips of rubber fabric and leather, made possible by the particular form of said sections, as hereinbefore stated and illustrated in Figs. 4 and 5. Furthermore, an advantage is gained by extending the ends c, c of the leather heel section forwardly, as shown and described, because of lessened liability of injury to the pad in removing or replacing the shoes. This will be understood from consideration of the fact that a horse-shoe is usually removed by the use of pincers which grasp the shoe near the rear end of one of its arms and at a point at which it is not connected to the hoof by the nails.

In removing a horse-shoe applied over a pad such as is shown in the said Larsen patent, the pincers will naturally be applied to the shoe adjacent to or just forward of the ends of the transverse leather heel strip and if the pincers when applied at this place are engaged with the rear end of the forward part of the rim, the latter is liable to be torn from the central plate and the pad thereby rendered unsuitable for further use. In the construction illustrated the horse-shoer, in applying the pincers to the shoe at the rear of the nails, will always necessarily insert one jaw of the pincers between the shoe and the leather heel section, and will thereby avoid grasping any part of the pad in the act of removing the shoe.

As a further improvement in hoof-pads of the character described, I make the meeting or abutting end margins of the toe and heel sections of such shape as to provide a series of interfitting or interlocking notches and projections on the two parts, as clearly seen in Fig. 2. Such interlocking notches and projections serve to hold the meeting edges of the arms on the toe and heel sections from becoming laterally shifted relatively to each other, and to thereby maintain the parts more firmly or securely in proper relative position.

While the accompanying drawings show both the heel and toe sections of the pad rim as secured to the central plate by means of rivets, it is to be understood that any other suitable or desired form of securing means may be employed for this purpose without departure from my invention.

I claim as my invention:

1. A hoof pad, adapted to be interposed between the hoof of a horse and a shoe, said pad comprising a flexible rim and a central plate or shield which is attached at its margins to the inner margins of said rim, said rim comprising toe and heel sections both made of U-form, the heel section consisting of leather, and having its end portions extended forwardly into position to be engaged by the securing nails of the shoe.

2. A hoof pad, adapted to be interposed between the hoof of a horse and a shoe, said pad comprising a flexible rim and a central metal plate or shield, which is attached at its margins to the inner margins of said rim, said rim comprising a toe section constituting substantially the forward half of the rim, and a U-shaped heel section of leather consisting of a transversely extending portion and forwardly extending end portions in abutting relation with the end margins of said toe portion, and located in position to be pierced and engaged by the securing nails of the shoe.

3. A hoof pad, adapted to be interposed between the hoof of a horse and a shoe, said pad comprising a flexible rim and a central metal plate or shield which is attached at its margins to the inner margins of said rim, said rim consisting of a toe section and a leather heel section, and the said sections being provided with interlocking notches and projections at their meeting margins.

In testimony, that I claim the foregoing as my invention I affix my signature in the presence of two witnesses, this 27th day of December A. D. 1912.

CARL A. JUDSEN.

Witnesses:
 CHARLES H. POOLE,
 EUGENE C. WANN.